United States Patent [19]

Goldenberg

[11] Patent Number: 5,016,326
[45] Date of Patent: May 21, 1991

[54] BELT CLIP

[76] Inventor: Michael P. Goldenberg, 1175 SW. 27th Pl., Boynton Beach, Fla. 33426

[21] Appl. No.: 624,455

[22] Filed: Dec. 10, 1990

Related U.S. Application Data

[63] Continuation of Ser. No. 391,056, Aug. 9, 1989, abandoned.

[51] Int. Cl.[5] ............................................. A45F 5/02
[52] U.S. Cl. .................................... 24/3 J; 24/511; 224/269
[58] Field of Search ............... 24/3 J, 3 L, 3 R, 511, 24/507–509, 499, 500; 224/252, 269, 271, 272; 455/351

[56] References Cited

U.S. PATENT DOCUMENTS

| | | |
|---|---|---|
| 163,794 | 5/1875 | Messer .................................. 24/511 |
| 1,024,266 | 4/1912 | Koons ................................... 24/67.3 |
| 1,061,412 | 5/1913 | Semon ..................................... 24/509 |
| 2,824,590 | 2/1958 | Anderson ......................... 24/509 X |
| 3,808,642 | 5/1974 | Nation . |
| 3,925,862 | 12/1975 | Youngblood, Jr. ............... 24/509 X |
| 4,083,481 | 4/1978 | Selinko . |
| 4,111,343 | 9/1978 | Selinko . |
| 4,536,925 | 8/1985 | Boothe et al. ...................... 24/3 J X |
| 4,635,836 | 1/1987 | Mooney et al. . |
| 4,828,153 | 5/1989 | Guzik et al. . |

*Primary Examiner*—James R. Brittain
*Attorney, Agent, or Firm*—William E. Koch; Vincent B. Ingrassia

[57] ABSTRACT

A pager includes a belt clip for securing the pager to another object, and a leaf spring for attaching the belt clip and pager housing together while providing a decreasing force between the belt clip and pager housing as the belt clip is opened.

9 Claims, 3 Drawing Sheets

BELT CLIP

This is a continuation of application Ser. No. 07/391,056, filed Aug. 9, 1989 and now abandoned.

FIELD OF THE INVENTION

This invention relates in general to a belt clip and more particularly to a spring assembly that secures the belt clip to a selective call receiver and provides a decreasing force between the belt clip and the selective call receiver when the belt clip is moved to an open position.

BACKGROUND OF THE INVENTION

Conventionally, selective call receivers, including pagers, have been packaged in a plastic housing with an attached belt clip. The belt clip is generally attached to the user's belt and thus exposed to various environments; therefore, it typically is designed to withstand excessive wear conditions. Pivotably attaching the belt clip to the pager by a pin is the most common method of attachment. Mechanical springs are used to exert force, provide flexibility, and store or absorb energy. Furthermore, a spring typically is coupled between the belt clip and pager for providing a clamping force between the belt clip and pager housing. The spring can be formed in any one of a number of configurations.

Generally, both the housing and the belt clip are molded of a durable plastic. A spring is inserted between the pager housing and belt clip to provide a constant clamping force. A pin is commonly used to hold the belt clip and housing together.

To open the belt clip assembly force is applied to the mounted end of the belt clip. The applied force must be greater than the clamping force. Typical belt clip configurations result in clamping forces which are less than those required to hold the clip open. Therefore, increasing the clamping forces will correspondingly increase the forces required to open the belt clip. This type of belt clip will be referred to as an increasing force belt clip. Since greater force is required to fully open the belt clip than to partially open it, the user is likely to open the belt clip just enough to clear the an object. This results in the belt clip being forced on and off of objects, which may damage the belt clip assembly or the attached object. Damage to the belt clip assembly generally requires replacing the pager housing and belt clip assembly.

Known belt clips utilize two basic, retaining pin designs. The first design comprises a roll pin, which is relatively crude in its manufacture when compared to machined pins; however, roll pins are low in cost. Typically, the belt clip and housing are manufactured from plastic and each have two supports molded on the outer surface such that the pin can be inserted to hold the entire configuration together. The roll pin is force fit into the holes of the supports for an interference fit, resulting in a constant stress that holds the belt clip and housing together. The roll pin usually places stresses on the plastic supports that may exceed the plastic's allowable stress. When this occurs, the housing support will yield making the belt clip assembly inoperable. This type of failure is not repairable because of the forces exerted by the spring; therefore, the housing assembly must be replaced which inconveniences the user.

The second pin design comprises a machined, clevis pin secured by an E-ring or other suitable latching mechanism. The machined pin generally does not result in damage to the product, however, the machined pin is relatively expensive.

Thus, what is needed is an improved apparatus for pivotably attaching a belt clip to a selective call receiver.

SUMMARY OF THE INVENTION

Accordingly, it is an object of the present invention to provide an improved belt clip for a selective call receiver.

In carrying out the above and other objects of the invention in one form, there is provided a method of incorporating a biasing element on a selective call receiver for securing a clip means to the selective call receiver, a decreasing force existing between the clip means and the selective call receiver when the clip means is moved to an open position.

DETAILED DESCRIPTION OF THE INVENTION

Figure 1:
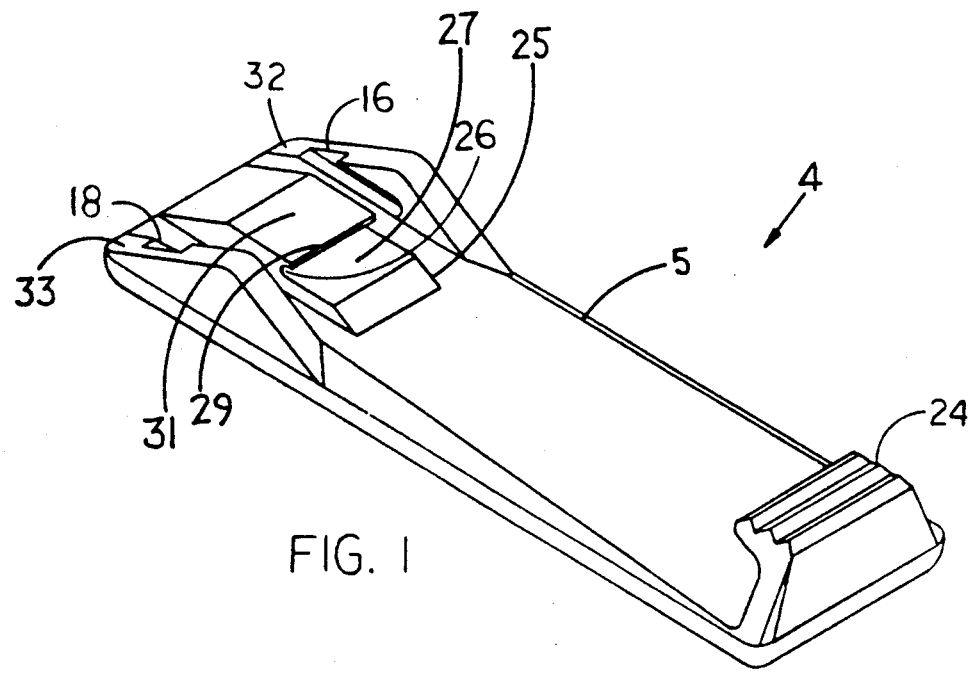
FIG. 1 is a perspective view of a belt clip in accordance with the present invention.
Figure 2:
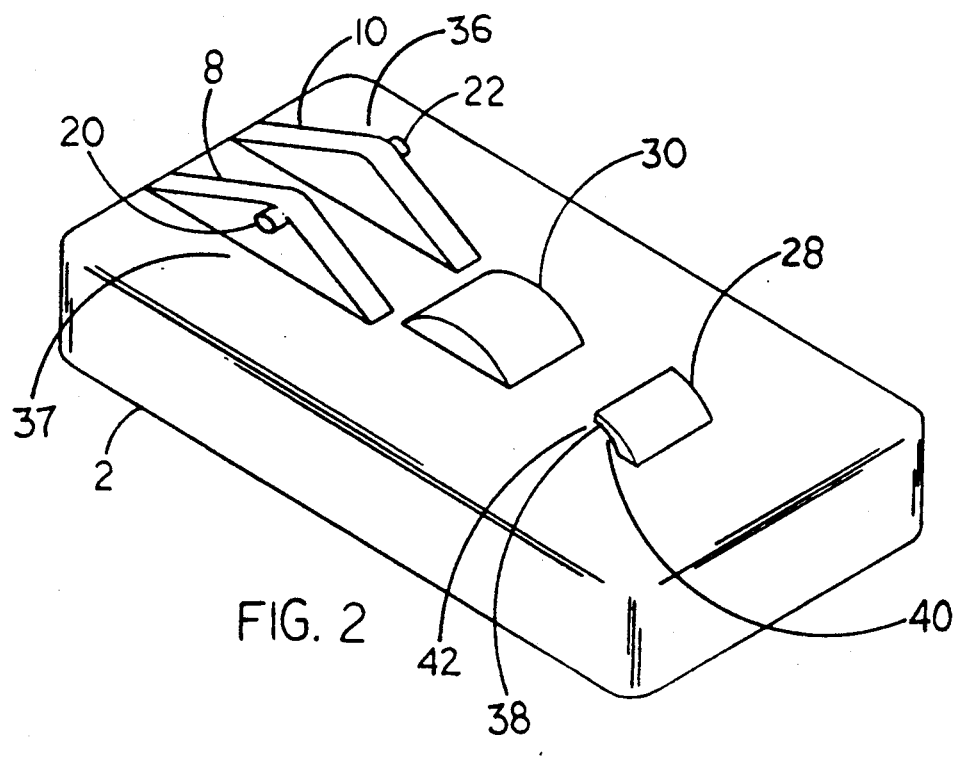
FIG. 2 is a perspective view of a pager housing in accordance with the present invention.
Figure 3:
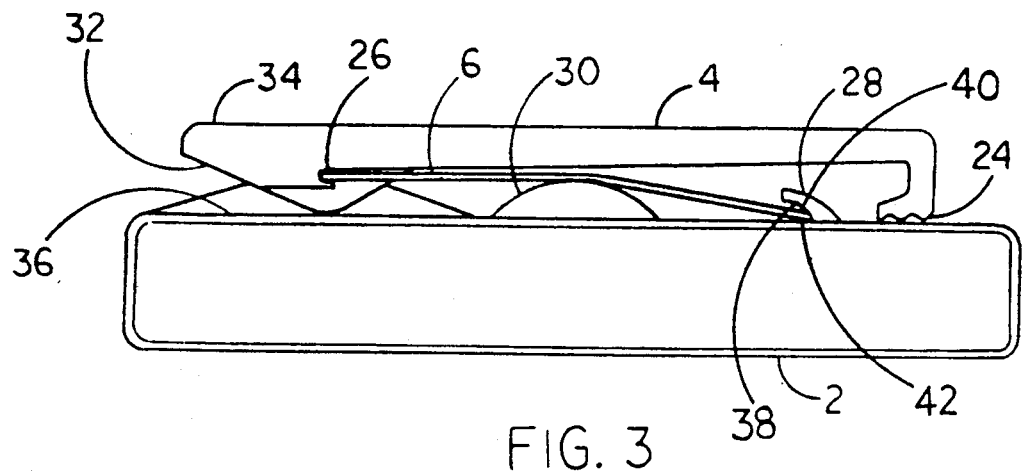
FIG. 3 is a cross sectional view showing the assembly of the belt clip, pager housing, and a leaf spring in the preferred embodiment of the present invention with the belt clip in the closed position.

Referring to FIGS. 1 and 2, a belt clip generally shown at 4 comprises a body 5 including a projecting member 25, slots 16, 18 and 26, a gripping pattern 24, an edge 29, and surfaces 27, 31, 32, and 33. The slots 16 and 18 receive fingers 20 and 22, respectively, of the selective call receiver housing 2. The slot 26 is formed by the surface 27 and the edge 29 which is contiguous to the surface 31 and receives a leaf spring 6 (FIG. 3). Although a leaf spring 6 is shown, other types of biasing elements could be used. The slot 26 is preferably located toward the first end of the belt clip 4 but may be located in any one of numerous positions along the belt clip 4. The gripping pattern 24, located at a second end of the belt clip 4, contacts the attached object when the belt clip 4 is in the closed position. The belt clip surfaces 32 and 33 contact the housing surfaces 37 and 36, respectively, when the assembled belt clip 4 is fully open position. The belt clip 4 is molded in one piece of a durable plastic in the preferred embodiment.

A pager housing 2 includes a slot 40 that is formed by a surface 38 of a projecting member 28 and the pager's housing surface 42. The slot 40 receives one end of the leaf spring 6. Fingers 20 and 22 extend from flange supports 8 and 10, respectively, and slideably engage the belt clip slots 16 and 18, respectively. The belt clip slots 16 and 18 and fingers 20 and 22 are held in place by forces exerted by the leaf spring 6. The pager housing surfaces 37 and 36 and belt clip surfaces 32 and 33, respectively, make contact when the belt clip 4 is in the fully open position (FIG. 4).

Referring to FIG. 3, the belt clip 4 includes the slot 26 for slideably engaging one end of the leaf spring 6. The opposite end of the leaf spring 6 is slideably engaged in the housing slot 40. The leaf spring 6 exerts force on both the housing slot 26 and the belt clip slot 40. The force exerted on the housing slot 40 is transferred to the belt clip 4 since the housing slot 40 is stationary. Therefore, the entire force exerted by the leaf spring 6 is directed to the belt clip slot 26. This work is transferred to the belt clip 4 as the belt clip slots 16 and 18 are held firmly against the housing fingers 20 and 22, respectively. The arcuate member 30 on the housing 2 prevents the leaf spring 6 from becoming fully extended. If the leaf spring 6 was allowed to be in a fully extended position, the belt clip 4 would be much more difficult to open. Moreover, the leaf spring 6 may deflect in the opposite direction than intended (toward the pager housing 2), preventing the belt clip 4 from opening fully. Therefore, the arcuate member 30 is preferred to ensure that the leaf spring 6 is at least partially bowed, as shown. The gripping pattern 24 contacts the pager housing 2 in the closed position, unless the belt clip 4 is attached to an object, in which case, the gripper pattern 24 would contact the object.

Figure 4:
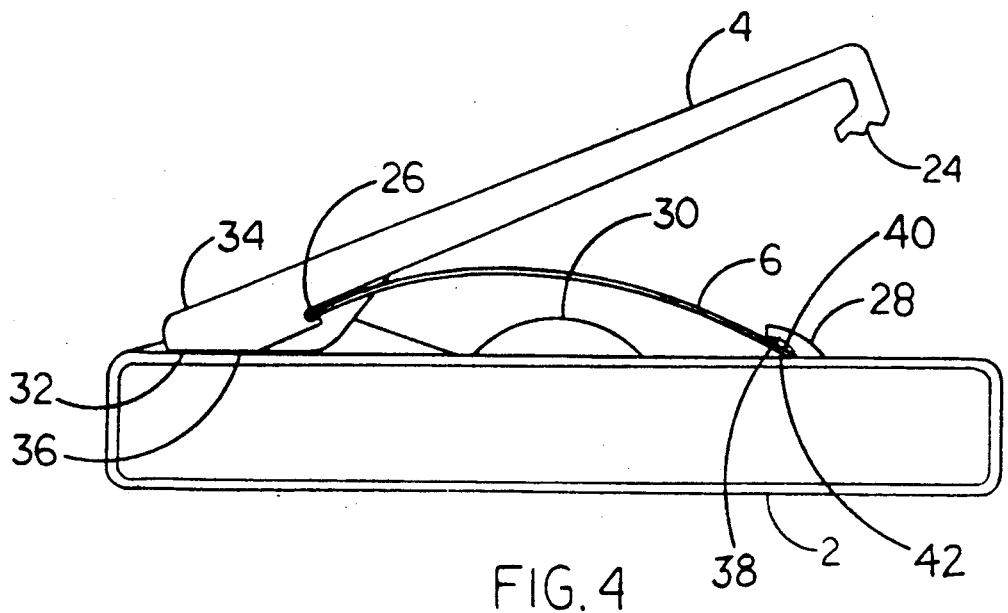
FIG. 4 is a cross sectional view showing the assembly of the belt clip, pager housing, and a leaf spring in the preferred embodiment of the present invention with the belt clip in the open position.

Referring to FIG. 4, the assembled belt clip 4 and pager housing 2 is shown in the open position. The degree that the belt clip 4 opens depends on the amount of pressure applied to the belt clip surface 34. As pressure is applied to the surface 34, some resistance will be felt due to the leaf spring 6. The belt clip 4 is shown in the fully pivoted or open position, such that the surface 32 on the belt clip 4 comes into contact with the housing surface 36. The gripping pattern 24 does not contact the pager housing 2 in the open position but would contact either the pager housing 2 or an object in the closed position. The belt clip 4 has the slot 26 for slideably engaging one end of the leaf spring 6. The opposite end of the leaf spring 6 is slideably engaged in the housing slot 40. The arcuate member 30 ensures that the leaf spring 6 remains in a slightly bowed position; therefore, maintaining a force that keeps the fingers 20 and 22 in the slots 16 and 18 respectively. The resulting forces hold the system together without the use of a pin.

Figure 5:
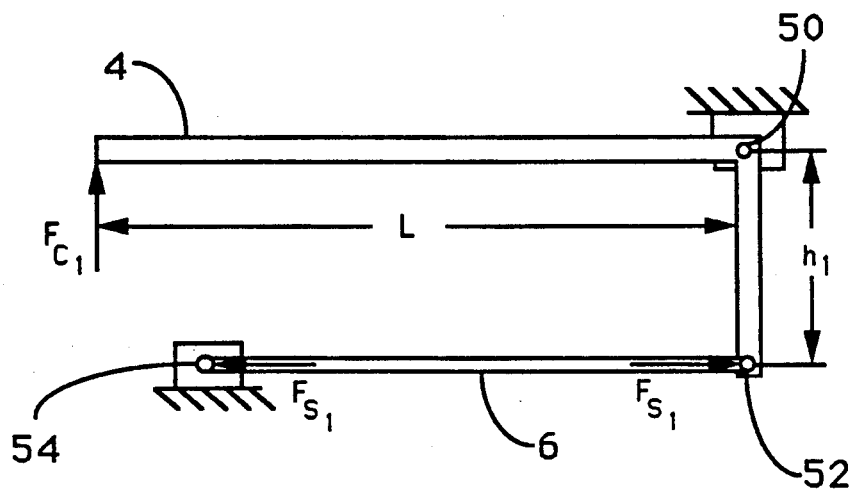
FIG. 5 is a kinematic diagram of the belt clip, leaf spring and pager housing assembly when the belt clip is in the closed position.

Referring to FIG. 5, the engagement of the fingers 20 and 22 and the belt clip slots 16 and 18 respectively, is represented by a pivot point 50. The belt clip slot 26 engages one end of the leaf spring 6, which is represented by a pivot point 52. The pager housing slot 40 engages the oppsite end of the leaf spring 6, represented by a pivot point 54. The leaf spring 6 is slightly bowed, resulting in the spring force $F_{S1}$ on the pivot points 52 and 54. This spring force $F_{S1}$ provides the axial loading that results in the clamping force between the belt clip 4 and the pager housing 2. In the closed position, the force $F_{C1}$ is exerted on the belt clip 4 and is a reaction of the clamping force. Dimension L is the distance from the pivot point 50 to the second end of the belt clip 4. Dimension $h_1$ is the distance between the pivot points 50 and 52. In the closed position, the opening force required to overcome the the leaf spring's 6 force is higher than at any other configuration.

Figure 6:
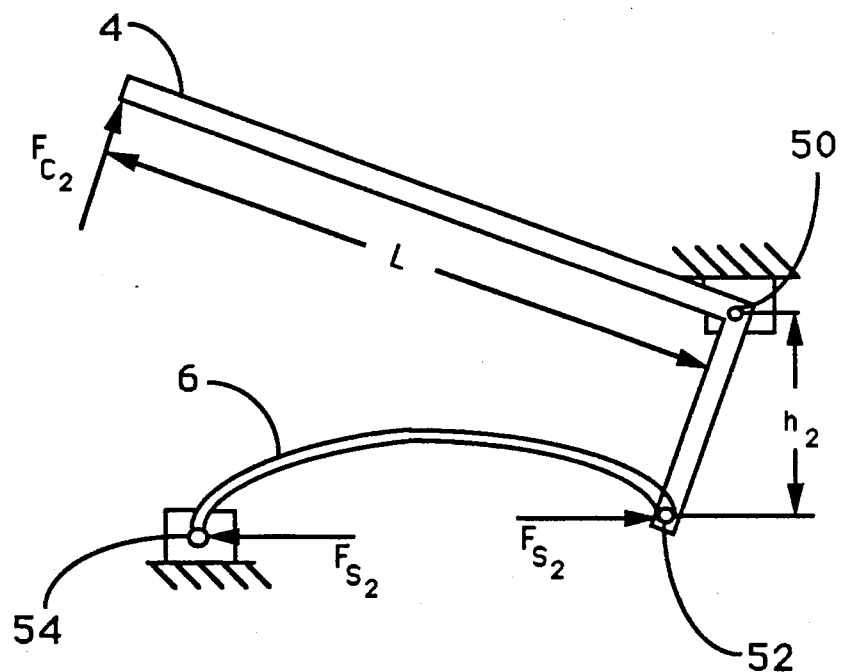
FIG. 6 is a kinematic diagram of the belt clip, leaf spring and pager housing assembly when the belt clip is in the open position.

Referring to FIG. 6, the force $F_{C2}$ results from the actuation force required to move the belt clip 4 to an open position. Dimension L is the distance from the pivot point 50 to the second end of the belt clip 4. Dimension $h_2$ is the distance between the pivot points 50 and 52. As the belt clip 4 is opened, the pivot point 52 rotates such that the leaf spring 6 begins to buckle. The resulting force, $F_{S2}$ occurs at the pivot points 52 and 54. As in the closed position, the spring force $F_{S2}$ provides the axial loading that results in the clamping force between the belt clip 4 and the pager housing 2. As the opening force overcomes the axial force $F_{S2}$, leaf spring 6 will begin to buckle. The forces, exerted by the leaf spring 6 buckling, will increase slowly as the opening between the belt clip 4 and the pager housing 2 is increased. As the force provided by the leaf spring 6 increases, the resistance to open the belt clip 4 will decrease since the effective lever arm of the belt clip 4 decreases at a rate greater than the force increases of the leaf spring 6.

Therefore, the force required to open the belt clip 4 from the closed position is greater than the force required to open the belt clip 4 further as it approaches the fully open position. Thus, the force required to open the belt clip 4 will decrease as the opening increases. Accodingly, the present invention provides the greatest clamping force in the closed position and a relatively small force in the open position. In this way, the pager is able to clamp solidly to an object in the closed position, and yet remain relatively easy to disengage from the object.

I claim:

1. A selective call receiver comprising:
   a housing,
   a clip means coupled to said housing, for securing said housing to another object, said clip means having an open and closed position relative to said housing such that one end of said clip means substantially contacts said housing in the closed position and said end one of said clip means pivots away from said housing in the open position, and
   a biasing element, coupled to said housing and said clip means, for securing said clip means to said housing and continually biasing the clip means toward the closed position, said biasing element providing a maximum resistance against pivotal movement of the clip means in the closed position and a reduced resistance against pivotal movement of the clip means in the open position.

2. The selective call receiver of claim 1 wherein said clip means comprises a belt clip.

3. The selective call receiver of claim 1 wherein said biasing element comprises a leaf spring.

4. The selective call receiver according to claim 1 wherein said housing comprises at least one finger for pivotably receiving said belt clip.

5. The selective call receiver according to claim 4 wherein said clip means comprises at least one slot for pivotably securing said selective call receiver thereto.

6. A selective call receiver, comprising:
   a housing;
   clip means coupled to said housing for attaching said housing to another object, said clip means having first and second portions, said clip means being pivotably attached to said housing substantially at said first portion such that such second portion substantially contacts said housing when said clip means is in a closed position and said second portion pivots away from said housing in response to an opening force to assume an open position; and
   biasing means, coupled to said housing and said clip means, for continually biasing the rotation of said second portion of said clips means toward said housing with an increasing resistance to the opening force as said clip means moves toward said closed position.

7. The selective call receiver of claim 6 wherein said biasing means comprises a leaf spring.

8. A selective call receiver, comprising:

a housing;

clip means pivotably coupled to said housing for attaching said housing to another object, said clip means having an open and closed position relative to said housing such that one end of said clip means substantially contacts said housing in the closed position and said one end of said clip means pivots away a from said housing in the open position and assumes a fully open position when said one end of said clip means pivots a predetermined distance from said housing; and biasing means for continually biasing said clip means with repsect to said housing, said biasing means having a maximum resistance to the opening force in the closed position, a decreased resistance to the opening force in the open position relative to the resistance provided in the closed position, and a non-zero minimum resistance to the opening force in the fully open position.

9. The selective call receiver of claim 8 wherein said biasing means comprises a leaf spring.

* * * * *